Dec. 12, 1950     G. A. BURNS     2,533,553
TRAILER STEERING MECHANISM
Filed March 6, 1947     2 Sheets-Sheet 1
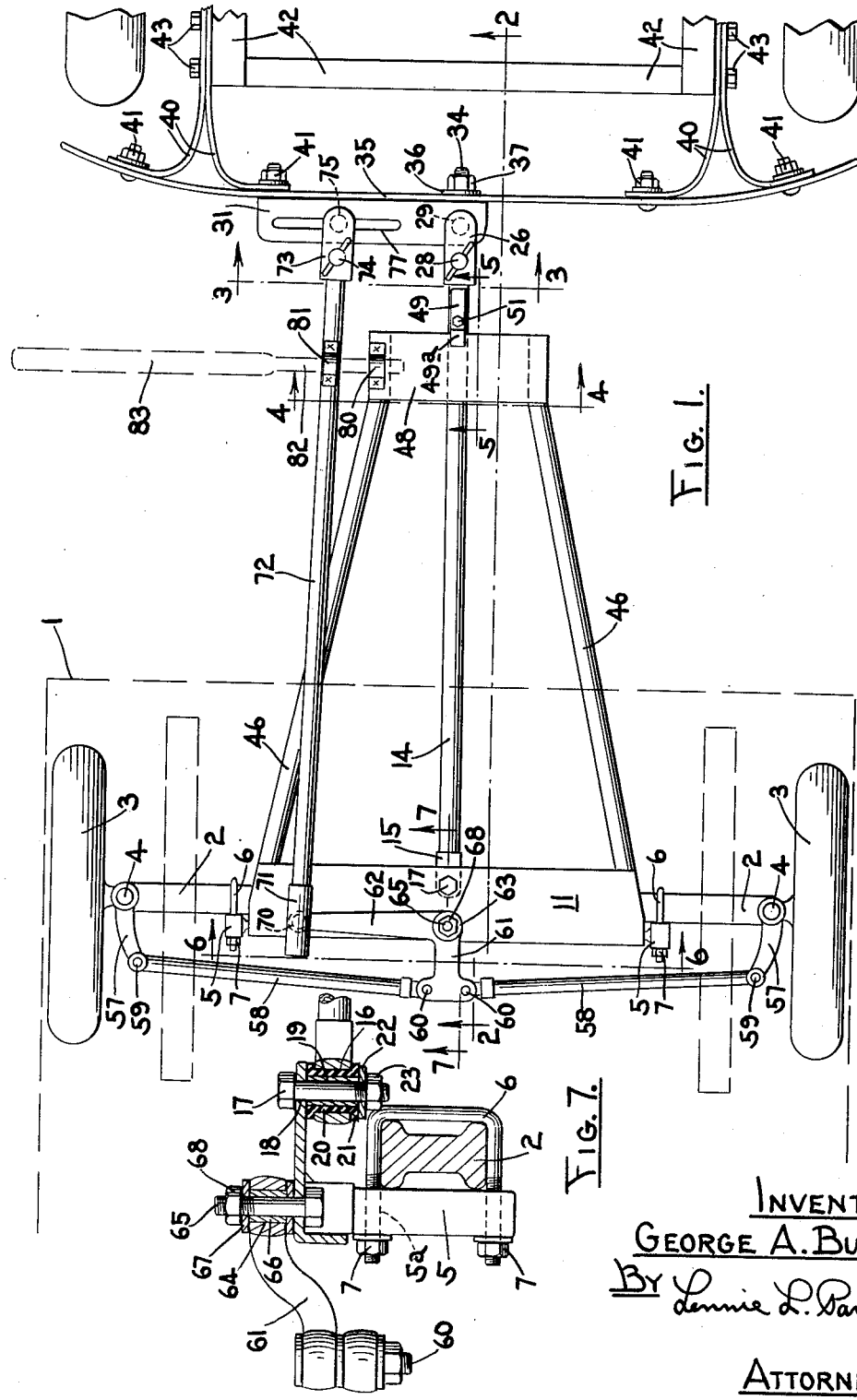
INVENTOR
GEORGE A. BURNS
By Lennie L. Parker
ATTORNEY

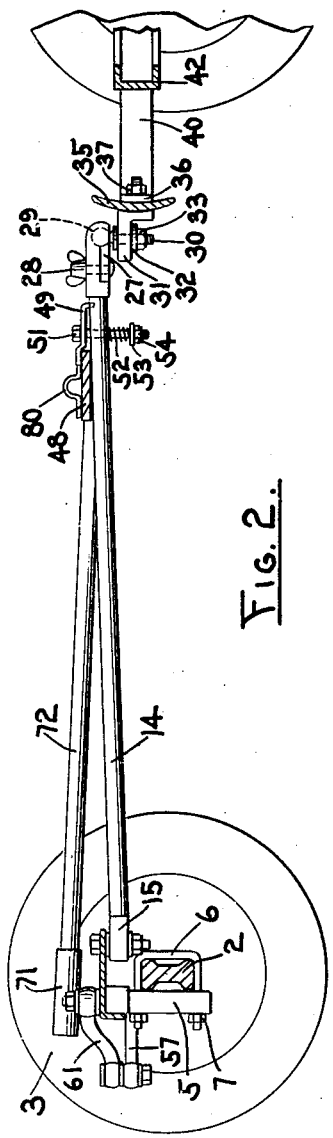

Patented Dec. 12, 1950

2,533,553

UNITED STATES PATENT OFFICE 2,533,553

TRAILER STEERING MECHANISM

George A. Burns, Muskegon, Mich.

Application March 6, 1947, Serial No. 732,684

5 Claims. (Cl. 280—33.55)

This invention relates to improvements in trailer steering mechanism.

In pulling a four-wheeled trailer with an automobile or tractor, it is desirable to have the trailer follow the automobile especially around curves with the wheels of the trailer going in the same tracks as the wheels of the automobile. Also in backing up an attached trailer with an automobile or tractor, it is desirable to have the trailer easily manageable without the trailer buckling. It is also desirable, in hauling a trailer, to prevent any side or vertical motion of the trailer from being transmitted to the pulling automobile. Another need in trailer steering mechanisms is to properly turn the wheels of the trailer to prevent the trailer wheels from being pulled or skidded sideways. Still another need is to provide a trailer steering mechanism that is easily located for attachment.

Therefore, the purpose of this present invention is to provide a trailer steering mechanism whereby: the trailer more nearly follows the pulling automobile; in backing the trailer, the trailer is prevented from jack-knifing by the steering of the trailer wheels; vertical or horizontal jerking motion of the trailer is not transmitted to the pulley automobile; when the pulley automobile is steered around a curve, the front wheels of the trailer are not skidded sideways but are turned to follow, through the pivoted tongue; the trailer connectors are easily located and attached, the automobile need only back up to a fairly close position to the connectors, the connectors movable horizontally and vertically for easy location with the automobile connectors.

Other objects and advantages of the present invention will become apparent, and an understanding of the invention with its simple and economical construction, which has been produced, may be had from the following description taken in connection with the accompanying drawings, in which, Figure 1 is a plan view of the trailer steering mechanism with a pulley automobile shown connected thereto.

Figure 2 is a vertical longitudinal sectional view through the steering mechanism taken along line 2—2 in Figure 1.

Figure 3 is a fragmentary vertical transverse sectional view taken along line 3—3 in Figure 1.

Figure 4 is a vertical transverse sectional view taken along line 4—4 in Figure 1.

Figure 5 is a fragmentary vertical longitudinal sectional view taken along line 5—5 in Figure 1.

Figure 6 is a transverse vertical sectional view taken along line 6—6 in Figure 1 and Figure 7 is an enlarged vertical longitudinal sectional view taken along line 7—7 in Figure 1.

All of the sectional views are looking in the direction indicated by the arrows.

Referring to the construction, as shown in the drawings, in which like reference numerals refer to like parts throughout the several views, the trailer 1 is provided with a transverse front axle 2. The front wheels 3 of the trailer are pivotally mounted at both ends of the axle on the vertical pins 4. Two spaced blocks 5 are attached to the rear side of the axle 2 by means of the U bolts 6 located around the axle 2 and extending through opening 5a in the blocks 5 with the nuts 7 screw threadedly received on the U bolts holding the blocks securely in place. Extending inwardly toward each other from the blocks 5 are the balls 8, each having a threaded stud 9 extending through the upper end of the blocks 5 held thereon by the nuts 10.

A horizontal plate 11 is provided at the rear edge with a downturned vertical portion 11a and blocks 12, each having an outwardly open semi-cylindrical socket 13 therein, are welded or otherwise secured to the under side of the outer ends of plate 11—11a. The sockets 13 are received over the balls 8 whereby the plate 11 is pivoted on the balls.

A draft tongue 14 has a head 15 attached to its rear end provided with a vertical cylindrical opening 16 and a king bolt 17 passes through an opening 18 in the plate 11 and through the opening 16 with the sleeve 19 located around the bolt and a grommet 20 with annular end flanges 21 located between the sleeve 19 and the opening 16. A washer 22 is located against the outer end of the grommet 20 and a nut 23 is screw threadedly received on the bolt 17 and turned tightly against the washer. The annular flanges 21 of the grommet 20 are compressed between the head 15 and the plate 11 and the washer 22. Thus the draft tongue 15 has a horizontal pivotal motion and a universal tilting motion.

The forward end of the draft tongue 14 has a socket head 26 secured thereto with a co-acting ball engaging clamp 27 releasably held in place by a wing nut 28. The socket head engages a ball 29 having a downwardly extending threaded stud 30 which extends downwardly through an opening in a bracket 31 with a washer 32 located therein against the under side of the bracket and the nut 33 holding the ball securely in place on the bracket.

The bracket 31 has two forwardly extending threaded studs 34 that extend horizontally forward through openings in the bumper 35 with washers 36 located over the studs and nuts 36 tightened on the studs against the washers securely holding the bracket 31 against the rear side of the bumper 35.

As is the usual practice, the bumper 35 is attached to supporting bars 40 by means of the bolt and nut connection 41 and the bars are attached to the automobile or tractor frame 42 with the bolts 43.

Secured to the under side of plate 11 at its ends are tubes 46 extending horizontally forward and converging with a stretcher plate 48 secured thereon and extending therebetween. Means are provided for holding the tongue 14 against the underside of the stretcher plate 48 but movable horizontally and transversely thereof. This means comprises the clip 49 with an upwardly offset portion 49a which engages the upper side of the stretcher plate while a finger 50 at the forward end of the clip 49 extends downwardly into an opening 50a in the upper side of the tongue. A bolt 51 extends downwardly through a vertical opening through the clip 49 and through the tongue 14 with a spring 52 located between a washer 53 and the tongue and a castellated nut 54 threadedly received on the end of the bolt. Thus the offset 49a of the clip 49 is held yieldably against the upper side of the stretcher plate thus allowing horizontal sideways motion of the tongue 14 relative thereto.

The foregoing description is of the means for pulling the trailer and the steering mechanism hereafter described. A steering arm 57 is attached to the hub of each wheel and extends rearwardly from the pivot pin 4. Each of the arms 57 has a tie rod 58 pivotally attached thereto at 59, the other end of each tie rod pivotally connected at 60 to one arm 61 of a bell crank lever 61—62. The hub 63 of the bell crank lever is provided with a central vertical cylindrical opening 64. A bolt 65 extends upwardly through an opening in the plate 11 and through the opening 64 with the bearing sleeve 66 located therebetween and with the washer 67 located between the plate 11 and hub 63 and between the hub and a nut 68 threadedly received on the bolt 65 holding the parts assembled.

The arm 62 of the bell crank lever 61—62 is provided at its outer end with a ball 71 with the head end 71a of rod 72 pivotally attached thereto. The forward end of the steering rod 72 has a head 73 secured thereto having a socket formed at its under side and the clamping member 73a holds the socket of the head 73 in engagement with a ball 75 by means of the thumb screw 74. The ball 75 is provided with a threaded stud 76 which extends downwardly through an elongated slot 77 in the bracket 31 with the washer 78 located on the stud between the bracket and the nut 79 tightened thereagainst.

With the tongue 14 pivotally connected to an automobile or tractor means are provided for locating the head 73 longitudinally over the ball 75. A socket member 80 is welded or otherwise secured to the top and at one side of the stretcher plate 48 and a similar socket member 81 is likewise secured to the steering rod 72 in a position adjacent the member 80. A rod 82 having a handle 83 is adapted to be received in both of the socket members 80 and 81 and by manipulating the handle 83 the socket of the head 73 may be moved to a position over the ball 75. The head 73 is thereafter lowered with its socket located over the ball 75 and the thumb screw 74 tightened to secure the connection.

In effecting a connection between an automobile and a trailer, provided with a steering mechanism of my invention, the automobile, having the bracket 31 attach to the bumper, is backed up with the bracket close to the tongue head 26. It will be noted that it is not necessary to locate the automobile exactly in a transverse or sideway direction to position the socket of head 26 over the ball 29 on the bracket 31. The tongue and frame consisting of rods 46 and plates 11 and 47 are free to pivot vertically on the balls 13. Also the tongue is free to pivot horizontally between the forward ends of the rods 46. Thus the automobile need be located transversely within the range of the horizontal pivotal motion of the tongue 14 between the forward ends of the rods 46. After the socket of the head 26 is located around the ball 29, the wing nut 28 is tightened securing the tongue 14 pivotally to the automobile bumper.

After the tongue 14 is pivotally attached to the bumper, in many cases it will be found that the socket of the head 73 does not line up longitudinally with the ball 75. The bar 82 may be inserted through the socket 81 and into the socket 80 and with a forward or rearward motion of the handle 83, the socket may be located longitudinally over the ball 75. With the socket of the head 73 located down over the ball 75 the wing nut 73 is tightened holding the steering rod securely and pivotally to the bracket and bumper.

In pulling the trailer forward the trailer is given its forward motion from the automobile though the draft tongue 14 pivotally connected at its forward end to the automobile bumper and at its rear end is horizontally pivotally connected to the plate 11 vertically pivotally mounted on the trailer axle. In turning the automobile to the right or left, the draft tongue 14 will pivot sideways correspondingly relative to the plate 48 supported in the tubes 46. This pivotal motion of the tongue allows the tongue to be turned without sliding the wheels of the trailer sideways or transversely. Also while the automobile is thus turned to the right or left, the steering rod 72, adjustably and pivotally connected to the bracket 31, is moved longitudinally in a corresponding direction, rotating the bell crank lever 61—62 about its pivot 65, and moving the tie rods longitudinally rotating the arms 57 and wheels 3 about the pivot pin 4 thus steering the trailer in the same direction that the automobile is turned. The adjustment of the ball 75 along the slot 77 in the bracket 31 allows the amount of turning to be varied according to the requirements.

This steering mechanism is especially useful when it is desired to reverse or back up the automobile with the attached trailer. While backing up in a turn the front wheels of the trailer are turned allowing them to follow the back wheels, thus preventing the trailer from jack-knifing. In backing and turning the back wheels of the trailer start in the direction of the turn but the front wheels are turned somewhat in this same direction, through the steering rod, bell crank and tie rods thus preventing the jack-knifing of the trailer.

Thus it will be seen that I have invented a trailer steering mechanism which accomplishes the object and purposes set forth early in the description and having thus described one form of my invention, other constructions and arrangements may be used without departing from the spirit of my invention, the scope of which is defined in the appended claims.

I claim:

1. A trailer having a front axle with steerable wheels mounted at each end thereof, a horizontal plate pivotally mounted at its rear edge on a horizontal lateral axis to the axle, stretcher plate supporting members secured to and extending forward from the ends of the horizontal plate, a stretcher plate secured to and extending between the forward ends of the supporting members, a tongue pivotally attached on a vertical axis to the horizontal plate extending forwardly therefrom and adjacent the stretcher plate, means for holding the tongue slidably adjacent the stretcher plate, the tongue adapted to be pivotally connected at its forward end to an automobile, means for steering the wheels of the trailer on longitudinal movement of the tongue, and means for connecting the steering means to the automobile laterally of the tongue connection.

2. A trailer having a front axle with steerable wheels mounted at each end thereof, a horizontal plate pivotally mounted at its rear edge on a horizontal transverse axis to the axle, stretcher plate supporting members secured to and extending forward from the horizontal plate, a stretcher plate secured between the forward ends of the supporting members, a tongue pivotally connected on a vertical axis to the horizontal plate and extending forward therefrom and adjacent to the stretcher plate, means for holding the tongue slidably against the stretcher plate, the forward end of the tongue adapted to be pivotally connected to an automobile, a steering arm attached to each wheel, a tie rod pivotally connected to each steering arm and to one arm of a bell crank lever, the bell crank lever pivotally mounted on the plate, a steering rod pivotally connected to the other arm of the bell crank lever and extending forwardly therefrom, the steering rod adapted to be connected to the automobile laterally of the tongue connection.

3. A mechanism as described in claim 2 including, a clip on the stretcher plate and a clip on the steering rod, the two clips normally in transverse alignment and adapted to receive an aligning bar.

4. A trailer steering mechanism, adapted to be connected between a trailer and a prime mover to impart forward movement of the prime mover to the trailer, the trailer having a front axle and steerable front wheels, comprising, a draft tongue pivotally connected at its rearward end to the axle of the trailer on both a vertical and a horizontal transverse axis and universally connected at its forward end to the prime mover, a wheel steering lever pivotally supported on the axle of the trailer on the same horizontal axis to which the draft tongue is connected to the axle at its rearward end, the wheel steering lever also connected to the axle on a vertical axis with a free end of the lever extending transversely of the rear connection of the draft tongue to the axle, the wheel steering lever operatively connected to the steerable wheels for operation thereof on pivotal motion of the lever, and a steering rod universally connected at its rearward end to the free end of the wheel steering lever and universally connected at its forward end to the prime mover transversely of the connection of the forward end of the draft tongue to the prime mover.

5. A trailer steering mechanism, adapted to interconnect a trailer and a prime mover for imparting forward movement of the prime mover to the trailer, the trailer having a front axle and steerable front wheels, comprising, a plate pivotally supported on the axle of the trailer on a horizontal transverse axis, a draft tongue pivotally connected at its rearward end to the plate on a vertical axis and universally pivoted at its forward end to the prime mover, a wheel steering lever pivotally connected to the plate on a vertical axis with a free end extending to a position transversely of the rearward connection of the draft tongue to the plate, and a steering rod universally connected to the free end of the wheel steering lever and universally connected at its forward end to the prime mover transversely of the connection of the forward end of the draft tongue to the prime mover.

GEORGE A. BURNS.

REFERENCES CITED

The following references are of record in the file of this patent:

UNITED STATES PATENTS

| Number | Name | Date |
| --- | --- | --- |
| 2,092,683 | Stidham | Sept. 7, 1937 |
| 2,100,447 | Mahaffey | Nov. 30, 1937 |
| 2,206,991 | William et al. | July 9, 1940 |
| 2,258,678 | Elwood | Nov. 14, 1941 |